Dec. 31, 1968 W. H. LEHNER 3,418,846
METHOD OF INSPECTING ALL-GLASS MULTIPLE GLAZED UNITS
Filed Sept. 23, 1964
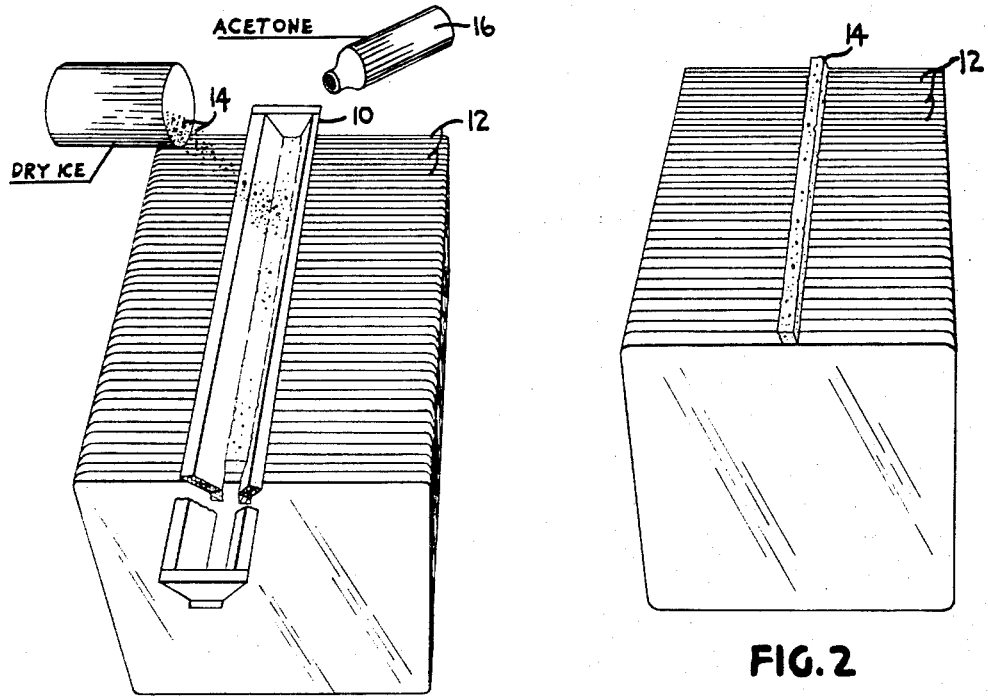
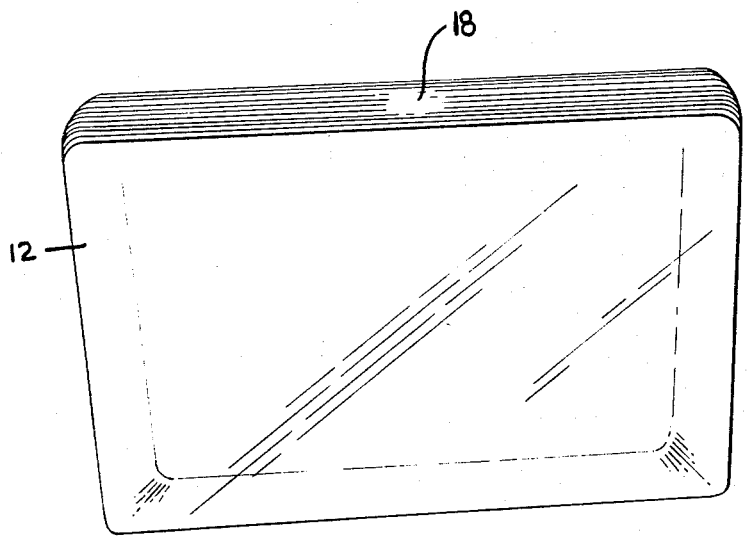
INVENTOR.
WALTER H. LEHNER
BY Chisholm and Spencer
ATTORNEYS

United States Patent Office 3,418,846
Patented Dec. 31, 1968

3,418,846
METHOD OF INSPECTING ALL-GLASS MULTIPLE GLAZED UNITS
Walter H. Lehner, Lincoln, Ill., assignor to PPG Industries, Inc., a corporation of Pennsylvania
Filed Sept. 23, 1964, Ser. No. 398,702
3 Claims. (Cl. 73—52)

ABSTRACT OF THE DISCLOSURE

A method of inspecting all-glass multiple glazed units for dew point comprising stacking a plurality of all-glass multiple glazed units in edgewise and closely spaced relation, chilling an exposed edge portion of all of the units simultaneously, and removing any defective units, as indicated by a visible formation of moisture within a unit at the chilled edge portion thereof.

---

The present invention relates to an improved method for inspecting hermetically sealed multiple glazed units. More specifically, this invention involves a novel method for determining whether the air or gas confined within a sealed all-glass double glazed unit is dry within limits that are commercially acceptable for this type of unit.

It has heretofore been known to construct all-glass or welded multiple glazed units and to imploy these units as a substitute for conventional single plates or sheets of glass in windows and other types of fenestrations. Typical welded double glazed units and their methods of manufacture are fully disclosed in U.S. Patents Nos. 2,624,979 and 2,999,036, granted to W. R. Clever et al. and assigned to the assignee of the present invention.

In one preferred method of fabricating welded double glazed units, a top sheet and a bottom sheet, which are to be formed into a sealed monolithic unit, are placed on a conveyor with one sheet following the other sheet in direct alignment therewith. The two sheets are moved along the conveyor through a washing, rinsing and drying operation. The sheets are then positioned and centered in vertical relation to vacuum heads and striping applicators. The vacuum heads engage and support the glass sheets and the striping applicators stripe the top sheet with an electrically conducting solution, such as colloidal graphite. The sheets are then deposited on a charging car in proper superimposed face-to-face alignment for fabrication into the desired welded double glazed unit.

After the sheets are superimposed and aligned in the above manner, they are heat treated for a period of from 40 seconds to 2 minutes in a preheat furnace having an ambient temperature of approximately 1300° F. During preheating, the glass sheets are heated to a temperature of approximately 600° to 800° F. in order to avoid thermal shock to the glass sheets during the subsequent welding operation.

After the superimposed glass sheets are heat treated, they are conveyed into a welding furnace where the ambient temperature is approximately 800° to 850° F. Upon attaining the desired position in the welding furnace, vacuum chucks cause the superimposed sheets to be separated in slightly spaced relationship to each other. The welding operation is then effected on the thus separated glass sheets.

Welding is accomplished by passing an electric current through the stripe of electrically conductive material to effect heating of the stripe and the glass immediately adjacent thereto. The margins of the top or upper sheet are heated in this manner until they droop and become welded to the margins of the bottom or lower sheet. The vacuum chuck is then operated to pull the top sheet upwardly to provide a chamber between the sheets. During this movement, the air pressure within the chamber is abruptly increased by permitting air from a pressurized external source to enter the unit through a pore opening provided in a face or edge of the unit. This operation effects filleting of the welded connection between the sheets.

The presence of the pore opening or pore hole in a face or an edge of the unit allows for equalization of the air pressure inside and outside the unit during subsequent annealing and cooling of the welded unit. Following annealing and cooling, the unit is purged through the pore hole, as by filling the chamber provided between the glass sheets with dry air or gas, and the pore hole is then sealed by any suitable method known to those skilled in the art. The completed units are inspected and then stacked in edgewise and closely spaced relation on pallets in preparation for packaging and/or shipment.

The sealed monolithic units described above are characterized by the permanent exclusion of significant amounts of moisture from the interior thereof. By this is meant that the temperature of condensation or dew point of any moisture allowed to remain within the unit, after purging, is well below the upper limit that is commercially acceptable for this type of unit. For the purpose of this invention, this upper temperature limit is at least −50° F. The dry air or gas sealed within this type of unit provides an excellent nonconductive medium for transmission of heat. This constitutes a unit that possesses excellent heat insulating and condensation preventing qualities.

In a mass production manufacturing process such as described above, it has been found to be economically imperative to inspect the completed glazing units for dew point characteristics on a statistical basis. On this basis, only a relatively small percentage of the units are actually dew pointed in an attempt to spot those areas in the fabrication process where defects persist in occurring. Thus, a relatively large number of units are not dew pointed, and potentially there exists among these a significant number of units that would exhibit defective dew points. Furthermore, such defective units would not normally be found during a final inspection, because they have sound seals and are defective due to being inadequately purged. These units would eventually have to be replaced in the field at some considerable expense.

While it is apparent that each unit could be dew pointed individually by employing known methods and apparatus, it has been found that such an approach is generally either too costly or too slow, or both.

The present invention provides a convenient solution to the above problems by providing a method of inspecting 100 percent of the all-glass units produced, in a quick and inexpensive manner. Briefly, this is accomplished by stacking a plurality of all-glass multiple glazed units, as they are mass produced, in edgewise and closely spaced relation and then dew pointing a selected area or portion of all of the units simultaneously. This permits insuring a consistent high standard of quality for all of the units shipped, by detecting and eliminating every unit that would have an excess amount of internal moisture.

The specific objects and advantages of this invention will become more apparent during the course of the following description, when taken in conjunction with the accompanying drawings.

In the drawings, wherein like numerals have been employed to designate like parts throughout the same, FIG. 1 is a schematic representation of a stack of edgewise disposed multiple glazed units and the dew pointing apparatus employed in the practice of the present invention.

FIG. 2 is a schematic representation similar to FIG. 1, with certain portions of the dew pointing apparatus removed.

FIG. 3 is a schematic representation of a multiple glazed unit, indicating the condensation of moisture on an interior edge surface portion of the unit after exposure to low temperature during dew pointing.

As best shown in FIG. 1 of the drawings, the apparatus employed in the practice of the present invention comprises a slanted, open bottom trough 10 that is positioned across a portion of one edge of each of a plurality of all-glass multiple glazed units 12 that are disposed in edgewise and closely spaced relation. The glazing units 12 may be stacked and supported on their edges subsequent to performing the final step in the actual manufacturing process, as by means of a pallet (not shown). In addition to the trough 10 there is provided a container of Dry Ice 14 and preferably a container of acetone 16. There may also be provided a leveling scraper (not shown) for reasons that will become more apparent hereinafter.

As illustrated in FIGS. 1 and 2 of the drawings, the novel dew pointing method of the present invention initially involves stacking the units 12 to be dew pointed in closely spaced relation on one edge. The slanted, open bottom trough 10 is then placed across the thus presented top or upper edges of all of the units 12 comprising the stack. A controlled ridge of crushed Dry Ice 14 is then strung out across the top edges of the units to be dew pointed. This is accomplished by pouring crushed Dry Ice 14 into the trough 10 from a suitable container, and then, preferably, leveling the Dry Ice 14 with a leveling scraper (not shown) to provide a controlled ridge thereof having a substantially uniform height.

Either before or after the trough is removed, acetone 16 or a similar highly volatile liquid may be added to the Dry Ice 14 for better conductivity and to drive the dew pointing temperature down rapidly to −100° F. or more.

In actual practice of the present invention, it has been found that by allowing a controlled ridge of approximately ¾ of an inch of Dry Ice 14 to remain on the edge of the units 12 when the trough 10 is removed, there is obtained a uniform chilled area across all of the units. After the Dry Ice and acetone, when employed, has been on the units being dew pointed for from 1 to 5 or more minutes, depending on the thickness of the glass and the desired temperature to which the units are to be dew pointed, the remaining Dry Ice is removed. Immediately after the Dry Ice has been taken off the units being dew pointed, the units should be visually inspected. Any excess moisture in the units will, as shown schematically in FIG. 3 of the drawings, show up as a fog or frost 18 clinging to the inside of the unit at the chilled edge area. All readings of a controlled chilled area are relative to each other and, thus, it can be determined by sight if the moisture content or relative humidity of the units meets quality control standards.

In the preferred manufacturing process described hereinabove, the operator would perform the pore hole sealing procedure, as in the past, and would then place the ware or multiple glazed units on pallets in edgewise disposed relation. However, before moving the full pallet to a storage area for final inspection and/or shipment, he would dew point all units by using the disclosed edge method of dew pointing. Thus, the present invention provides a simple, efficient and economic method of accurately determining and maintaining a consistently high standard of quality for the multiple glazed units shipped while, at the same time, successfully employing modern mass production techniques.

From the above description and specific embodiment of the present invention, it will be readily apparent to those skilled in the art that various modifications may be made without departing from the spirit of the invention. For example, it should be obvious that the method of the present invention is not limited to multiple glazed units comprising two sheets of glass, since this method may be equally well employed to inspect multiple sheet glazing units made up of three or more sheets of glass. Furthermore, it should be apparent that the specific chilling medium employed, as well as the quantity thereof and the time of exposure of the multiple glazed units thereto, depends principally on the thickness of the glass being employed and the desired temperature to which the units are to be dew pointed.

While the present invention has been described with reference to the specific details of a certain embodiment, it is not intended that such details shall be regarded as limitations upon the scope of the invention except insofar as included in the accompanying claims.

I claim:

1. A method of inspecting multiple glazed units for the presence of an excessive amount of included moisture comprising stacking a plurality of hermetically sealed, all-glass multiple glazed units in edgewise and closely spaced relation, simultaneously chilling an exposed edge portion of each of said units to at least −50° F., and removing any defective units, as indicated by a visible formation of moisture within a unit at the chilled edge portion thereof.

2. The method of claim 1 wherein the exposed edge portion of each of said units is chilled by placing Dry Ice in direct contact therewith.

3. The method of claim 2 which further includes the addition of acetone with the Dry Ice.

References Cited

UNITED STATES PATENTS

| 2,649,707 | 8/1953 | Donath et al. | 73—29 |
| 2,777,324 | 1/1957 | Ives | 73—73 |

OTHER REFERENCES

"An Electrical Method of Measuring Water Vapour Pressure in a Sealed-Off Discharge Tube," by B. N. Clark in Journal of Scientific Instruments and of Physics in Industry, vol. 26, February 1949, pp. 58-59.

RICHARD C. QUEISSER, *Primary Examiner.*

C. IRVIN McCLELLAND, *Assistant Examiner.*

U.S. Cl. X.R.

73—73